(12) United States Patent
Kim et al.

(10) Patent No.: US 9,008,366 B1
(45) Date of Patent: Apr. 14, 2015

(54) BIO-INSPIRED METHOD OF GROUND OBJECT CUEING IN AIRBORNE MOTION IMAGERY

(71) Applicant: HRL Laboratories, LLC, Malibu, CA (US)

(72) Inventors: Kyungnam Kim, Oak Park, CA (US); Changsoo S. Jeong, Rancho Palos, CA (US); Deepak Khosla, Camarillo, CA (US); Yang Chen, Westlake Village, CA (US); Shinko Y. Cheng, Cupertino, CA (US); Alexander L. Honda, Los Angeles, CA (US); Lei Zhang, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 78 days.

(21) Appl. No.: 13/938,196

(22) Filed: Jul. 9, 2013

Related U.S. Application Data

(63) Continuation-in-part of application No. 13/748,522, filed on Jan. 23, 2013, now Pat. No. 8,885,887.

(60) Provisional application No. 61/589,696, filed on Jan. 23, 2012, provisional application No. 61/780,129, filed on Mar. 13, 2013, provisional application No. 61/779,989, filed on Mar. 13, 2013, provisional application No. 61/783,453, filed on Mar. 14, 2013.

(51) Int. Cl.
*G06K 9/00* (2006.01)
*G06K 9/62* (2006.01)

(52) U.S. Cl.
CPC .................................. *G06K 9/6202* (2013.01)

(58) Field of Classification Search
None
See application file for complete search history.

(56) References Cited

U.S. PATENT DOCUMENTS 7,697,725 B2    4/2010   Burns et al.
2011/0142283 A1   6/2011   Huang et al.

OTHER PUBLICATIONS

Land, M F; Fernald R D. "The Evolution of Eyes", Annual Review of Neuroscience 15: 1-29 (1992) by Land and Fernand.
Cucchiara, C. Grana, M. Piccardi, and A. Prati, "Detecting moving objects, ghosts and shadows in video steams", IEEE Trans. on Patt Anal. And Machine lntell vol. 25, No. 10, Oct. 2003, pp. 1337-1342,.

(Continued)

*Primary Examiner* — Atiba O Fitzpatrick
(74) *Attorney, Agent, or Firm* — Tope-McKay & Associates (57) ABSTRACT

Described is method for object cueing in motion imagery. Key points and features are extracted from motion imagery, and features between consecutive image frames of the motion imagery are compared to identify similar image frames. A candidate set of matching keypoints is generated by matching keypoints between the similar image frames. A ground plane homography model that fits the candidate set of matching keypoints is determined to generate a set of correct matching keypoints. Each image frame of a set of image frames within a selected time window is registered into a reference frame's coordinate system using the homography transformation. A difference image is obtained between the reference frame and each registered image frame, resulting in multiple difference images. The difference images are then accumulated to calculate a detection image which is used for detection of salient regions. Object cues for surveillance use are produced based on the detected salient regions.

18 Claims, 8 Drawing Sheets

(56) References Cited

OTHER PUBLICATIONS

D. Koller J. Weber, T Huang, J. Malik, G. Ogasawara, B. Rao, and S. Russel, "Towards Robust Automatic Traffic Scene Anaiysis in Real-Time," In Proceedings of Int'l Conference on Pattern Recognition, 1994, pp. 128-131.

Sudipta N. Sinha, Jan-Michael Frahm, Marc Pollefeys, and Yakup Genc, "GPU-Based Video Feature Tracking and Matching", EDGE 2006, workshop on Edge Computing Using New Commodity Architectures, Chapel Hill, May 2006.

Lowe, David G. (1999). "Object recognition from local scale-invariant features". Proceedings of the International Conference on Computer vision 2. pp. 1150-1157.

Herbert Bay, Andreas Ess, Tinne Tuytelaars, Luc Van Gool. "SURF: Speeded Up Robust Features" Computer Vision and Image Understanding (CVIU), vol, 110, No. 3, pp. 346-359, 2008.

Martin A. Fischler and Robert C. Bolles (Jun. 1981). "Random Sample Consensus: A Paradigm for Model Fitting with Applications to Image Analysis and Automated Cartography" Comm. of the ACM 24 (6): 381-395.

Z. Yin and R. Coffins, "Moving Object Localization in Thermal Imagery by Forward-Backward Motion History Images," Book chapter in Augmented Vision Perception in Infrared, by Riad I, Hammoud (Ed.), Springer-Verlag, Adv. Pattern Recognition Series, 2009, ISBN: 978-1-84800-276-0.

Subhabmta Bhattacharya, Haroon Idress, Imran Saleemi, Saad Ali, and Mubarak Shah, "Moving Object Detection and Tracking in Infrared Aerial Imagery", Machine Vision Beyond Visible Specturm, Augmented Vision and Reality, vol. 1, 2011 Springer series, DOI: 10.1007/978-3-642-11568-4.

Ondfej Chun, Jil Mates, Josef Kittler, "Locally Optimized RANSAC", Pattern Recognition (2003), pp. 236-243.

Z. Yin and R.Collins, "Moving Object Localization in Thermal Imagery by Forward-backward MHI," CVPR Workshop on Object Tracking and Classification in and Beyond the Visible Spectrum (OTCBVS), New York City, NY, Jun. 2006.

Saad Ali and Mubarak Shah, COCOA—Tracking in Aerial Imagery, SPIE Airborne Intelligence, Surveillance, Reconnaissance (ISR) Systems and Applications, Orlando, 2006.

Jiangjian Xiao, Hui Cheng, Feng Han, Harpreet S. Sawhney: Geospatial aerial video processing for scene understandig and object tracking, CVPR 2006.

Anubhav Agarwal, C. V. Jawahar, P. J. Narayanan, "A Survey of Planar Homography Estimation Techniques", Technical Reports, International Institute of Information Technology, 2005.

Lauarent Itti, Christof Koch, and Ernst Niebur, A Model of Saliency-Based Visual Attention for Rapid Scene Analysis, IEEE Transaction on Pattern Analysis and Machine Intelligence, vol. 20, No. 11, Nov. 1998, pp. 1254-1259.

Serre, T. and Poggio T., "A Neuromorphic Approach to Computer Vision", Communications of the ACM (online), vol. 53, No. 10, Oct. 2010.

Mutch, J, and Lowe, D., "Multiclass Object Recognition with Sparse, Localized Features," Proc. of IEEE Conf. on Computer Vision and Pattern Recognition, Jun. 17-22, 2006, pp. 11-18.

David G. Lowe, "Object recognition from local scale-invariant features,"0 International Conference on Computer Vision, Corfu, Greece (Sep. 1999), pp. 1150-1157.

Richard Hartley and Andrew Zisserman "Multiple View Geometry in Computer Vision," Second Edition, Cambridge University Press, Mar. 2004, Section 4.7.1, pp. 117-121.

Vladimir N. Vapnik and Corinna Cortes in "Support-Vector Networks", Machine Learning, 20, 1995.

Laurent Itti, Christof Koch, and Ernst Niebur, A Model of Saliency-Based Visual Attention for Rapid Scence Analysis, IEEE Transactions on Pattern Analysis and Machine Intelligence, vol. 20, No. 11, Nov. 1998. pp. 1254-1259.

Serre, T. and Poggio. T., "A Neuromorphic Approach to Computer Vision", Communications of the ACM (online), vol. 53, No. 10, Oct. 2010.

Mutch, J. and Lowe, D., "Multiclass Object Recognition with Sparse, Localized Features," Proc. of IEEE Conf. on Computer Vision and Pattern Recognition, Jun. 17-22, 2006, pp. 11-18.

David G. Lowe, "Object recognition from local scale-invariant features," International Conference on Computer Vision, Corfu, Greece (Sep. 1999), pp. 1150-1157.

Richard Hartley and Andrew Zisserman "Multiple View Geometry in Computer Vision," Second Edition., Cambridge University Press, Mar. 2004, Sec. 4.7.1, pp. 117-121.

BIO-INSPIRED METHOD OF GROUND OBJECT CUEING IN AIRBORNE MOTION IMAGERY

CROSS-REFERENCE TO RELATED APPLICATIONS

This is a Continuation-in-Part application of U.S. Non-Provisional application Ser. No. 13/748,522, filed in the United States on Jan. 23, 2013, entitled, "System for Object Detection and Recognition in Videos Using Stabilization," which is a Non-Provisional patent application of U.S. Provisional Application No. 61/589,696, filed in the United States on Jan. 23, 2012, entitled, "System for Object Detection and Recognition in Videos Using Stabilization."

This is ALSO a Non-Provisional patent application of U.S. Provisional Application No. 61/780,129, filed in the United States on Mar. 13, 2013, entitled, "MogM—A Bio-Inspired Method of Ground Object Cueing in Airborne Motion Imagery."

This is ALSO a Non-Provisional patent application of U.S. Provisional Application No. 61/779,989, filed in the United States on Mar. 13, 2013, entitled, "Robust Ground-Plane Homography Estimation Using Adaptive Feature Selection."

This is ALSO a Non-Provisional patent application of U.S. Provisional Application No. 61/783,453, filed in the United States on Mar. 14, 2013, entitled, "Moving Object Spotting by Forward-Backward Motion History Accumulation."

GOVERNMENT LICENSE RIGHTS

This invention was made with government support under U.S. Government Contract Number HR0011-10-C-0033 Neovision2. The government has certain rights in the invention.

BACKGROUND OF THE INVENTION (1) Field of Invention

The present invention relates to a system for object cueing in motion imagery and, more particularly, to a system for object cueing in motion imagery using bio-inspired features for frame-to-reference registration.

(2) Description of Related Art

There are many different approaches to detecting objects of interest in motion imagery. The exhaustive search approach is to train a classifier and run an exhaustive scan over a pre-defined object window. However, this approach produces a lot of false alarms depending on classification performance. Furthermore, this approach is a computationally expensive method and also suffers from being unable to detect objects that are dissimilar to training examples. Previous pixel-level change detection methods, such as background subtraction, inter-frame differencing, and three frame differencing, are widely used (see Literature Reference Nos. 1 and 2).

Background subtraction relies on a background model for comparison, but adaptive background updating is costly for a moving camera. Inter-frame differencing easily detects motion but does a poor job of localizing the object (i.e., usually only parts of the object are detected). Specifically, inter-frame differencing only detects leading/trailing edges of translating objects with uniform color. Three-frame differencing uses future, current, and previous image frames to detect motion but can coarsely localize the object only if a suitable frame lag is adopted.

The closest prior art to the present invention includes U.S. Pat. No. 7,697,725, entitled, "Method and apparatus for autonomous object tracking" and U.S. Patent Publication No. 2011/0142283, entitled, "Apparatus and method for moving object detection." These prior methods describe an apparatus and method to detect moving objects by computing a corresponding frame difference for every two successive image frames of a moving object, and segmenting a current image frame of the two successive image frames into a plurality of homogeneous regions. The system gradually merges the computed frame differences via a morphing-based technique to obtain the location of the moving object. These prior methods are prone to noise in features to be used in estimating global motion compensation. The implemented image alignment or frame-to-reference registration module is usually very time-consuming and not good for real-time operations. Also, in order to achieve the best performances, they require manual parameter tuning, which is a tedious job and prevents rapid field deployment.

Each of the prior methods described above exhibit limitations that make them incomplete. Thus, a continuing need exists for a method that can be used to cue moving objects of interest in motion imagery captured either from stationary or mobile sensors, estimate parameters automatically, and reduce searching time, making the whole surveillance system work in real-time.

SUMMARY OF THE INVENTION

The present invention relates to a system for object cueing in motion imagery and, more particularly, to a system for object cueing in motion imagery using bio-inspired features for frame-to-reference registration. The system comprises one or more processors and a memory having instructions such that when the instructions are executed, the one or more processors perform multiple operations. First, key points and bio-inspired features are extracted from input motion imagery. The input motion imagery comprises a sequence of image frames obtained with a sensor. Features between consecutive image frames in the sequence of image frames are compared to identify a set of image frames having similar features. Then, keypoints between the set of image frames are matched to generate a candidate set of matching keypoints. A ground plane homography model that fits the candidate set of matching keypoints is determined to generate a set of correct matching keypoints and an accurate homography transformation between the set of image frames. Each image frame within a selected time window is registered into a reference frame's coordinate system using the homography transformation. A difference image is obtained between the reference frame and each registered image frame within the time window, resulting in a plurality of difference images. The plurality of difference images is accumulated to calculate a detection image, and salient regions are detected from the detection image by blob extraction. Object cues for surveillance use are produced based on the detected salient regions.

In another aspect, the detection image is thresholded by a predefined threshold value.

In another aspect, parameters for object cueing are automatically selected based on information obtained from the sensor, wherein the parameters comprise at least one of: time window size, minimum pixel area of a target of interest, maximum pixel area of a target of interest, and the predefined threshold value.

In another aspect, a size of a time window is determined using information obtained from the sensor according to the following:

$$k = \frac{(\text{half}_{length})}{(\text{target}_{speed})} * (fps),$$

where k denotes a half size of a time window, $\text{half}_{length}$ denotes half of the length of a target, $\text{target}_{speed}$ denotes the speed of the target, and fps denotes a video frame rate in frames per second.

In another aspect, the detection image is calculated according to the following:

$$D = Th\{\Sigma_{i=0}^{2k} \text{abs}(F_i - F_k)\} \quad th = k*m*\sigma,$$

where D denotes the detection image, Σ denotes a summation, abs denotes absolute value, $F_i$ is the ith image frame within a time window of size 2k+1, $F_k$ is a current image frame, Th represents a thresholding function, th denotes the predefined threshold value, σ is an average background noise level, and m is a scaler for σ.

In another aspect, random sample consensus is used to determine the ground plane homography model.

As can be appreciated by one skilled in the art, the present invention also comprises a method for causing a processor to perform the operations described herein.

Finally, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for object cueing in motion imagery and, more particularly, to a system for object cueing in motion imagery using bio-inspired features for frame-to-reference registration. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Subsequently, a description of various principal aspects of the present invention is provided. Finally, specific details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Cucchiara, C. Grana, M. Piccardi, and A. Prati, "Detecting moving objects, ghosts and shadows in video streams", IEEE Trans. on Patt. Anal. and Machine Intell., vol. 25, no. 10, October 2003, pp. 1337-1342.
2. D. Koller, J. Weber, T. Huang, J. Malik, G. Ogasawara, B. Rao, and S. Russel, "Towards Robust Automatic Traffic Scene Analysis in Real-Time," in Proceedings of Int'l Conference on Pattern Recognition, 1994, pp. 126-131.

3. Sudipta N Sinha, Jan-Michael Frahm, Marc Pollefeys, and Yakup Genc, "GPU-Based Video Feature Tracking and Matching", EDGE 2006, workshop on Edge Computing Using New Commodity Architectures, Chapel Hill, May 2006.
4. Lowe, David G. (1999). "Object recognition from local scale-invariant features". Proceedings of the International Conference on Computer Vision. 2. pp. 1150-1157.
5. Herbert Bay, Andreas Ess, Tinne Tuytelaars, Luc Van Gool, "SURF: Speeded Up Robust Features", Computer Vision and Image Understanding (CVIU), Vol. 110, No. 3, pp. 346-359, 2008.
6. Martin A. Fischler and Robert C. Bolles (June 1981). "Random Sample Consensus: A Paradigm for Model Fitting with Applications to Image Analysis and Automated Cartography". Comm. of the ACM 24 (6): 381-395.
7. Anubhav Agarwal, C. V. Jawahar, P. J. Narayanan, "A Survey of Planar Homography Estimation Techniques", Technical Reports, International Institute of Information Technology, 2005.

(2) Principal Aspects

The present invention has three "principal" aspects. The first is a system for object cueing in motion imagery. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for object cueing in motion imagery. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Specific Details

The present invention describes a method and system to cue moving ground objects from airborne motion imagery for automatic visual surveillance and tracking, which is referred to as MogProcessor for Mobile platforms, or MogM. Cueing and localizing moving objects, such as pedestrians and vehicles, is important for automatic tracking system initialization and recovery from tracking failure. By processing the cued areas of moving objects only, it reduces the search space for subsequent steps like object recognition (e.g., is this a car?) and/or object identification (e.g., is this a previously tracked object?).

The present invention uses bio-inspired features for frame-to-reference registration with the middle-frame reference or first-frame reference. Robust feature detection is very computationally intensive, so the system makes use of graphics processing unit (GPU) processors to meet the real-time processing requirement. Blob detection is then performed on the difference image over those registered frames. Object cues after size filtering and merging are finally reported to surveillance users or transferred to the next steps in a visual surveillance system. Each of these steps will be described in further detail below. The MogM parameters for registration and blob detection are automatically determined by the aerial platform's navigation metadata. This makes the object cueing system fully automatic with minimal human intervention, which is critical for field deployment without intensive user training.

Conventional background subtraction methods can cue moving objects for stationary cameras but do not work for mobile cameras (e.g., unmanned aerial vehicles (UAVs), pan-tilt cameras), since the scene always changes and the methods cannot model fixed backgrounds. Detecting independently moving objects from motion imagery taken by mobile sensors requires video stabilization using ego-motion compensation so that it can separate objects from the background. Traditional computer vision approaches to high level functions, such as recognition on images, generally involve exhaustive computations. The system of the present invention can be a fast, parallelizable cueing step to the resource heavy steps of the vision process in visual surveillance. It reduces the original full image input of a computer vision system down to a handful of detections. This means that full images need not be transmitted in applications with bandwidth-limited links, but only a handful of small image chips. It can act as a front end for any system which does not require the full input image.

The unique advantages of this invention include, but are not limited to, the following: no background modeling or training is needed; search space is deduced for time consuming high-level steps like object recognition/identification; automatic MogM parameters are estimated using the mobile platform information, robust GPU powered frame-to-reference registration is performed using bio-inspired features; blob detection performed from difference accumulation over a multi-frame window; a process that is easily parallelizable; and a process that is operable on motion imagery from stationary cameras as well as moving ones.

The present invention can be employed as a front-end step for any visual cueing-based surveillance systems. The system can play a critical role as a reusable core engine of a larger software project. Furthermore, the potential commercial applications are mobile phone apps, wide area surveillance, and motion-based games.

(3.1) MogM Object Cueing Process

Figure 1:
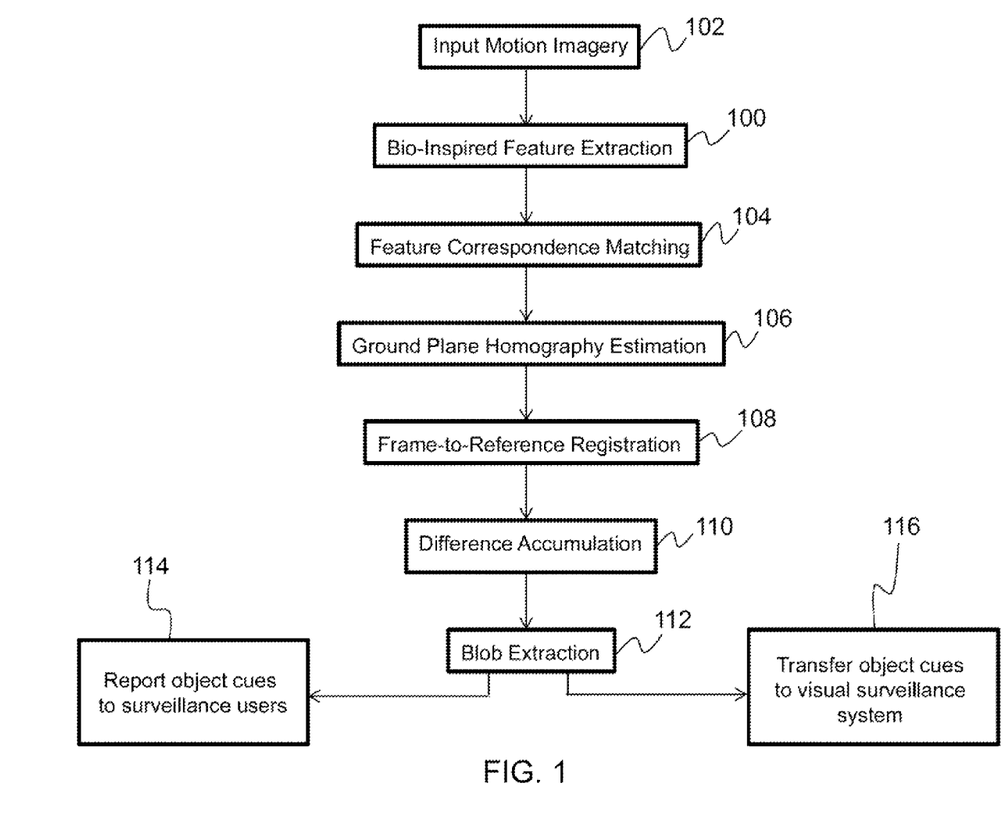
FIG. 1 is a flow diagram of the moving object cueing process for airborne motion imagery according to principles of the present invention.

In typical intelligence, surveillance, and reconnaissance (ISR) missions, motion imagery taken from airborne platforms contains image motion due to platform motion and jittering/vibration of the sensor(s). In order to cue salient or independently moving ground objects in those videos, the video images need to be stabilized frame-by-frame so that stationary backgrounds remain fixed in the image. In the present invention, aerial videos are stabilized by registering image frames to a certain global coordinate system. Once warped into the global coordinate system, videos of the scene appear stable with the ground plane and other environmental structures being fixed in the image so that independently moving objects (non-limiting examples of which include ground vehicles and dismounts) are the only moving objects in the video. The full processing chain of moving object cueing in airborne motion imagery using frame-to-reference registration and blob detection on difference images is illustrated in FIG. 1 and described in detail below.

(3.1.1) Bio-Inspired Feature Extraction

The process begins with a bio-inspired feature extraction step 100. Key points and feature descriptors are extracted from input motion imagery 102. The extracted key points and feature descriptors are used for feature correspondence matching in a feature correspondence matching step 104. In a desired aspect, the bio-inspired scale invariant feature transform (SIFT) is used as a feature descriptor (see Literature Reference No. 4). SIFT is invariant to scale, orientation, and affine distortions.

Since feature extraction is quite computationally intensive and can be parallelized, a graphics processing unit (GPU)-powered implementation (see Literature Reference No. 3) is used for real-time operations. Key points are defined as maxima and minima of the result of difference of Gaussians function applied in scale-space to a series of smoothed and re-sampled images. Dominant orientations are assigned to localized key points. SIFT feature descriptors are 128-D vectors representing the gradient orientation histograms and can be used to compare if two image key points are similar (i.e., they are from the same point in the scene). An alternative fast feature extractor is speeded-up robust features (SURF) (see Literature Reference No. 5). As can be appreciated by one skilled in the art, SIFT, SURF, or any other suitable feature extractor/descriptor can be use for feature extraction in the present invention.

(2.1.2) Feature Correspondence Matching

The feature correspondence matching step 104 compares the two sets of features extracted in the feature extraction step 100 and matches the key points from one image to another that has similar features. This results in a list of candidate set of matching points from the two images to be filtered in a subsequent ground plane homography estimation step 106. Any suitable matching technique can be employed. As a non-limiting example, a match for a key point in one image is defined as the key point in the other image with the minimum Euclidean distance based on the descriptor vectors of the key points.

(3.1.3) Ground Plane Homography Estimation

The list of matching points is not very reliable in that incorrect matches can happen due to noise and inherence capability of SIFT descriptors in distinguishing certain types of key points. Therefore, to achieve reliable matching, random sample consensus (RANSAC) is applied. RANSAC is an iterative method to estimate parameters of a mathematical model from a set of observed data that contains outliers (see Literature Reference No. 6). RANSAC is used to find a ground plane homography transform (model) that fits the candidate set of matches. As a result, a set of correct matches is obtained as well as an accurate transformation (homography) between the two images.

(3.1.4) Frame-to-Reference Registration

A frame-to-reference registration step 108 is used to warp the image frames into the global coordinate frame. A time window size of N frames is chosen in which each frame is warped to the first or middle reference frame in the window using the homography transformation found in the ground plane homography estimation (see Literature Reference No. 7) step 106. For example, in the first-frame mode, Frames 1, . . . , N are registered into the coordinate system of Frame 1, Frames N+1, . . . , 2N are registered into Frame N+1, and so forth. This way, the images within each window are stabilized with respect to the reference frame of the window.

(3.1.5) Difference Accumulation

After frame-to-reference registration 108, one knows that all the frames are registered to the reference frame's coordinate system. The difference image between the reference frame and each frame within a window is then obtained. Those difference images only produce pixel differences on independently moving objects against the background or ground plane. In a difference accumulation step 110, the motion pixel detection process will accumulate the differences with several registered frames within a window to boost moving regions. For example, in the center-frame reference mode with the window size of 1, the reference frame $F_i$, previous frame $F_{i-1}$, and next frame $F_{i+1}$ are used for calculating the frame differences. Typically, several previous and next frames are used to obtain robust detections.

(3.1.6) Blob Extraction

The final step in object cueing is to threshold the accumulated difference image (or detection image) by the predefined threshold in a blob extraction step 112. The thresholded binary image leaves out foreground masks which are then processed by connected component analysis, morphological operations, and blob labeling. On the binary image, the connected component analysis is applied to connect neighboring foreground pixels and finally generate blobs of connected pixels. Each blob represents an object in motion (or part of it), or sometimes multiple objects merged into a single blob. To remove small noisy blobs and fill small holes in a blob, the morphological operation is applied. Then the final blobs (motion region) are labeled as "detections". Each labeled blob is reported as a detection chip with additional information, such as location, size, major axis, and pixel area.

The whole visual cueing process described above is biologically inspired. "To minimize the effect of eye motion while the animal moves, most such eyes have stabilizing eye muscles" is a quotation from "The Evolution of Eyes", Annual Review of Neuroscience 15: 1-29 (1992) by Land and Fernand. Similarly, the present invention stabilizes the images by compensating the effect of camera motion to clearly see moving objects on the ground. Technically, the present invention stabilizes a temporal block of N frames in a sliding window fashion, takes/merges the differences between the reference frame and others, and finally detects salient regions by blob extraction with morphological operations.

(3.2) Automatic Parameter Selection from Platform/Sensor Information

The cueing process of the present invention has several key parameters that affect the cueing performance. For rapid field deployment of the system and minimal end-user training it is necessary for the parameters to be set automatically, or at least within the range that a user can easily adjust for his/her cueing/tracking missions. The key MogM parameters including the following:

k: half size of temporal block (or window)
th: threshold for difference image
min_area: minimum pixel area of target of interest
max_area: maximum pixel area of target of interest The pixel area parameters min_area and max_area can be determined based on the ground sampling distance (GSD) of the specific sensor at the given platform altitude. For example, in missions of car cueing, if GSD=0.2 meters/pixel, min_area can be set as 8×20 and max_area as 12×30, assuming that mid-size cars are sized 2 meters (m) in width and 5 m in length (10×25 in pixels). If the GSD information is not directly available, GSD can be calculated using the camera resolution, field-of-view, angle-to-ground, and height-to-ground.

The half size of temporal block, k, is determined by the video frame rate (frames per second, or fps), the speed of the target of interest, and the length of the target of interest. Intuitively, k is the number of frames within which the target moves by the half length of the target. For example, when the average values of car length and speed are 5 m and 20 m/second (sec) and the video rate is 30 fps, k can be set as 3 or 4. Depending on the target size and speed, k can be increased and decreased. In experimental studies, videos were taken at 30 fps (altitude=800-1200 meters; speed=40-70 meters/sec). If the scene doesn't change much, one can use larger block sizes. Otherwise, the block size should be smaller to ensure proper overlap between the images in a single block as follows:

$$k = \frac{(half\_length)}{(target\_speed)} * (fps).$$

Below is an equation for calculating the detection image by accumulating the difference images:

$$D = Th\{\Sigma_{i=0}^{2k} abs(F_i - F_k)\} \; th = k*m*\sigma,$$

where abs represents absolute value, and $\Sigma$ denotes a summation. $F_i$ is the i-th frame within the block of size 2k+1, and $F_k$ is the current frame where one detect targets from. All the frames in the block are in gray scale and stabilized or registered into the coordinate system of the reference frame. The sum of the absolute difference is thresholded between $F_i$ and $F_k$. The binary detection image D is obtained using the thresholding function Th and the threshold value th is scaled by k. $\sigma$ is the average noise level of the background pixels. If the background pixels fluctuate 5 gray-scale levels on average, m is the scaler for $\sigma$. It was determined from experimental studies that m=4-5 works well.

Figure 2A:
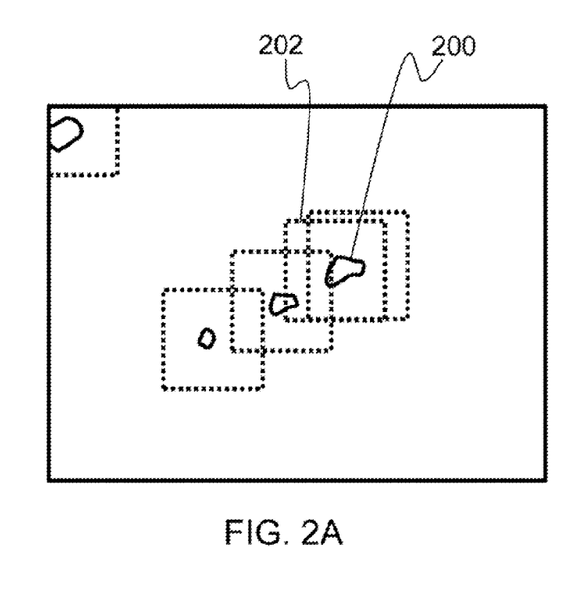
FIG. 2A illustrates object cueing results on an aerial video according to principles of the present invention.
Figure 2B:
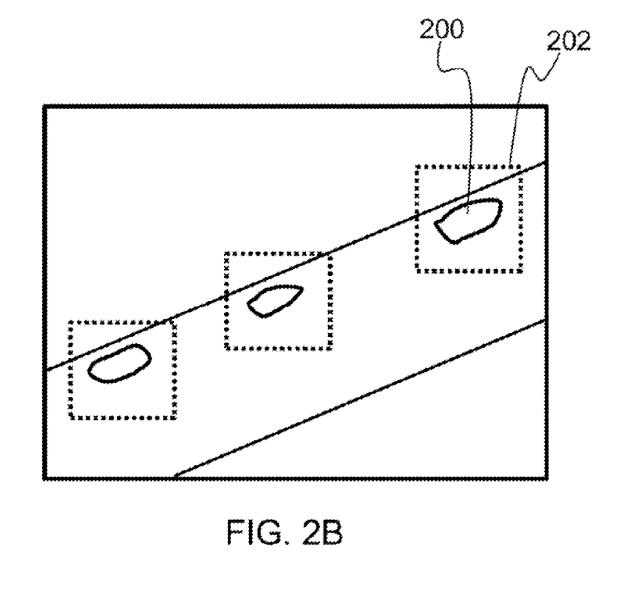
FIG. 2B illustrates object cueing results on an aerial video according to principles of the present invention.

FIGS. 2A and 2B illustrate object cueing results on two Defense Advanced Research Projects Agency (DARPA) Video Verification of Identity (VIVID) aerial videos. Moving objects 200 (e.g., vehicles) detected by the method of the present invention are outlined with a dashed outline 202. FIGS. 2A and 2B depict the detection of moving objects 200 in the videos captured from an aerial vehicle flying and looking down toward the ground. Since the capturing platform is moving while the target ground objects (i.e., moving objects 200) are moving independently at the same time, it is not trivial to separate the target movement from the background movement. The present invention effectively detects target objects by stabilizing the scene over time and accumulating the changes.

Figure 3A:
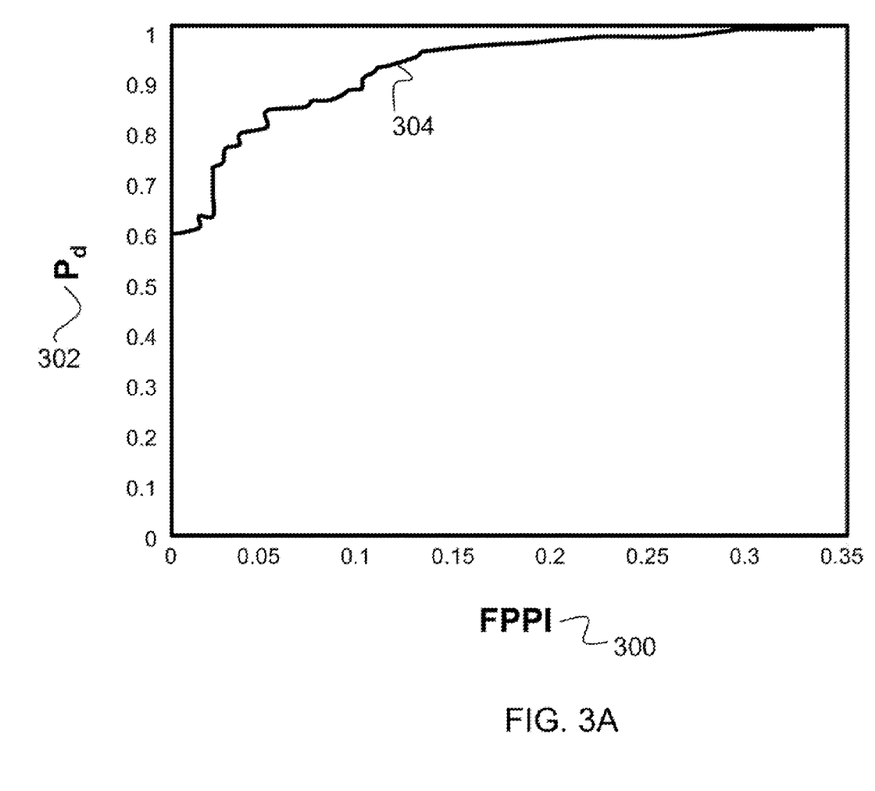
FIG. 3A illustrates detection performance for the object cueing results depicted in FIG. 2A according to principles of the present invention.
Figure 3B:
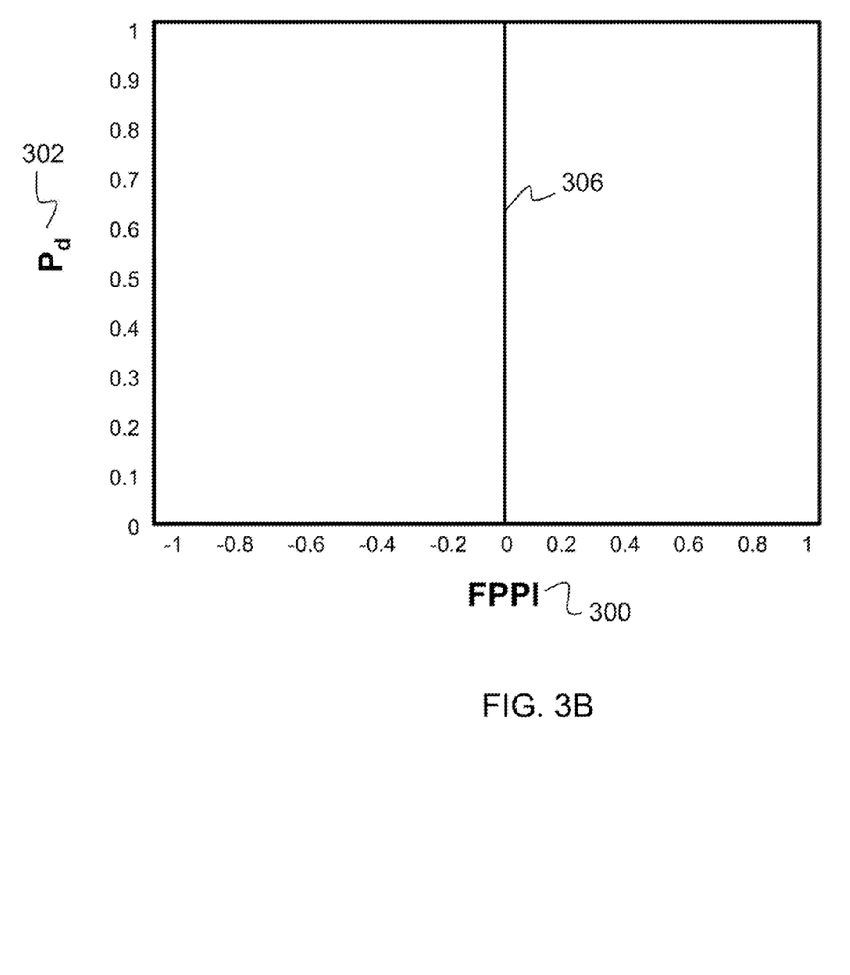
FIG. 3B illustrates detection performance for the object cueing results depicted in FIG. 2B according to principles of the present invention.

FIGS. 3A and 3B illustrate receiver operator characteristic (ROC) curves of detection performance for the VIVID data in FIGS. 2A and 2B, respectively. A ROC curve is a graphical plot which illustrates the performance of a binary classifier system as its discrimination threshold is varied. Along each of the x-axes is the false positive per image (FPPI) 300, or false positive rate. Along each of the y-axes is the probability of detection (Pd) 302, which is the true positive rate. The ROC curve 304 in FIG. 3A shows that 90% probability of true detection was achieved at 0.1 FPPI. The ROC curve 306 in FIG. 3B indicates perfect detection of all the targets in the VIVID data depicted in FIG. 2B with no false alarms.

Figure 4A:
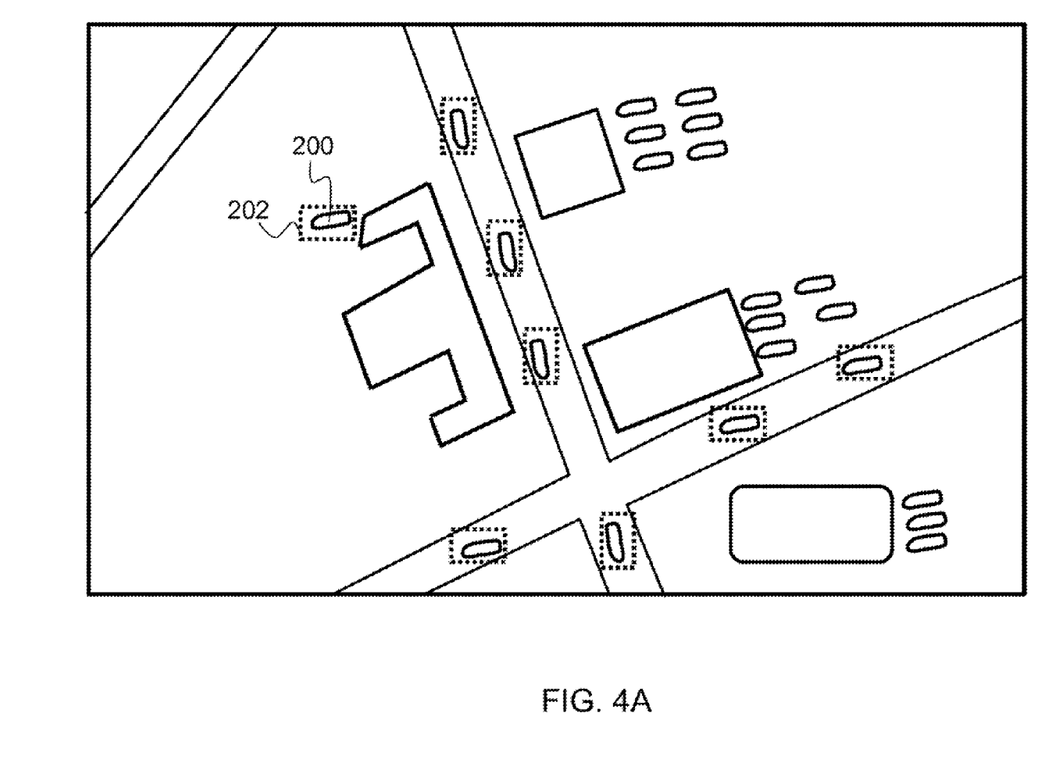
FIG. 4A illustrates object cueing results from wide field-of-view airborne motion imagery according to the principles of the present invention.
Figure 4B:
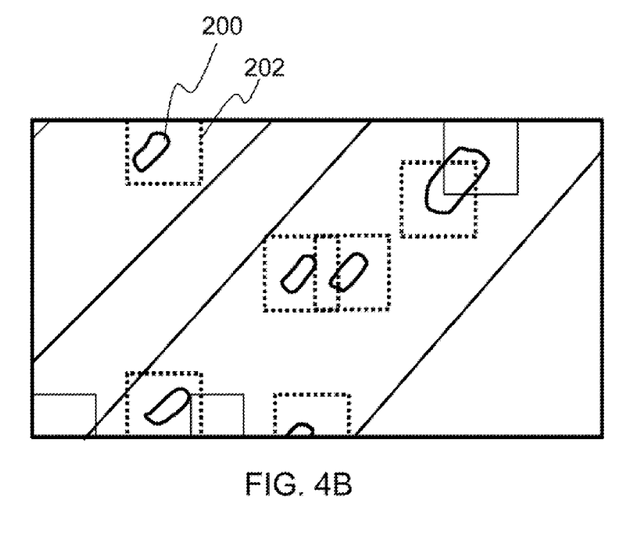
FIG. 4B illustrates object cueing results from motion imagery captured from a low-flying helicopter according to principles of the present invention.
Figure 4C:
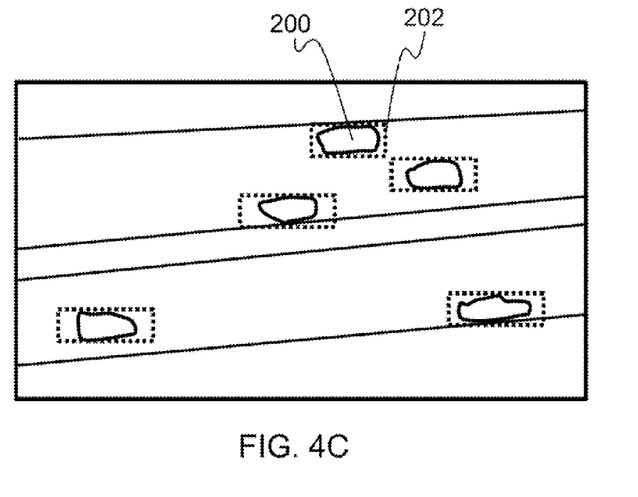
FIG. 4C illustrates object cueing results from motion imagery captured from a low-flying helicopter according to principles of the present invention.

FIGS. 4A-4C illustrate additional object cueing results from using the invention described herein. FIG. 4A is a wide field-of-view airborne motion imagery with moving objects 200 (e.g., vehicles) detected, as indicated by a dashed outline 202. FIGS. 4B and 4C depict scenes of moving objects 200 (e.g., vehicles) detected from freeway movies captured from a low-flying helicopter, as indicated by a dashed outline 202.

Figure 5:
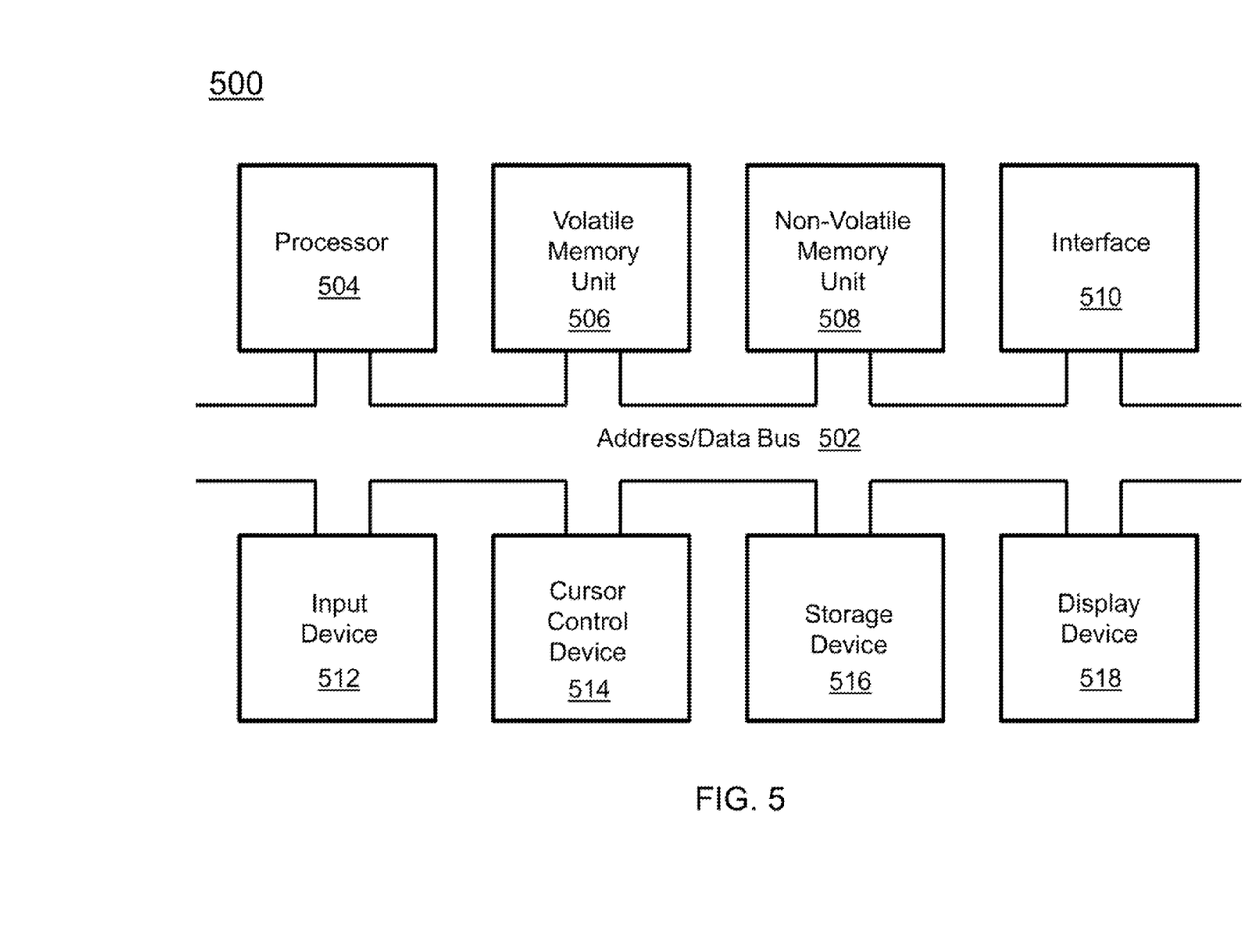
FIG. 5 is an illustration of a data processing system according to principles of the present invention.

An example of a computer system 500 in accordance with one aspect is shown in FIG. 5. The computer system 500 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 500. When executed, the instructions cause the computer system 500 to perform specific actions and exhibit specific behavior, such as described herein.

The computer system 500 may include an address/data bus 502 that is configured to communicate information. Additionally, one or more data processing units, such as a processor 504, are coupled with the address/data bus 502. The processor 504 is configured to process information and instructions. In one aspect, the processor 504 is a microprocessor. Alternatively, the processor 504 may be a different type of processor such as a parallel processor, or a field programmable gate array.

The computer system 500 is configured to utilize one or more data storage units. The computer system 500 may include a volatile memory unit 506 (e.g., random access memory ("RAM"), static RAM, dynamic RAM, etc.) coupled with the address/data bus 502, wherein a volatile memory unit 506 is configured to store information and instructions for the processor 504. The computer system 500 further may include a non-volatile memory unit 508 (e.g., read-only memory ("ROM"), programmable ROM ("PROM"), erasable programmable ROM ("EPROM"), electrically erasable programmable ROM "EEPROM"), flash memory, etc.) coupled with the address/data bus 502, wherein the non-volatile memory unit 508 is configured to store static information and instructions for the processor 504. Alternatively, the computer system 500 may execute instructions retrieved from an online data storage unit such as in "Cloud" computing. In an embodiment, the computer system 500 also may include one or more interfaces, such as an interface 510, coupled with the address/data bus 502. The one or more interfaces are configured to enable the computer system 500 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 500 may include an input device 512 coupled with the address/data bus 502, wherein the input device 512 is configured to communicate information and command selections to the processor 500. In accordance with one aspect, the input device 512 is an alphanumeric input device, such as a keyboard, that may include alphanumeric and/or function keys. Alternatively, the input device 512 may be an input device other than an alphanumeric input device. In one aspect, the computer system 500 may include a cursor control device 514 coupled with the address/data bus 502, wherein the cursor control device 514 is configured to communicate user input information and/or command selections to the processor 500. In one aspect, the cursor control device 514 is implemented using a device such as a mouse, a track-ball, a track-pad, an optical tracking device, or a touch screen. The foregoing notwithstanding, in one aspect, the cursor control device 514 is directed and/or activated via input from the input device 512, such as in response to the use of special keys and key sequence commands associated with the input device 512. In an alternative aspect, the cursor control device 514 is configured to be directed or guided by voice commands.

In one aspect, the computer system 500 further may include one or more optional computer usable data storage devices, such as a storage device 516, coupled with the address/data bus 502. The storage device 516 is configured to store information and/or computer executable instructions. In one aspect, the storage device 516 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 518 is coupled with the address/data bus 502, wherein the display device 518 is configured to display video and/or graphics. In one aspect, the display device 518 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 500 presented herein is an example computing environment in accordance with one aspect. However, the non-limiting example of the computer system 500 is not strictly limited to being a computer system. For example, one aspect provides that the computer system 500 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 6:
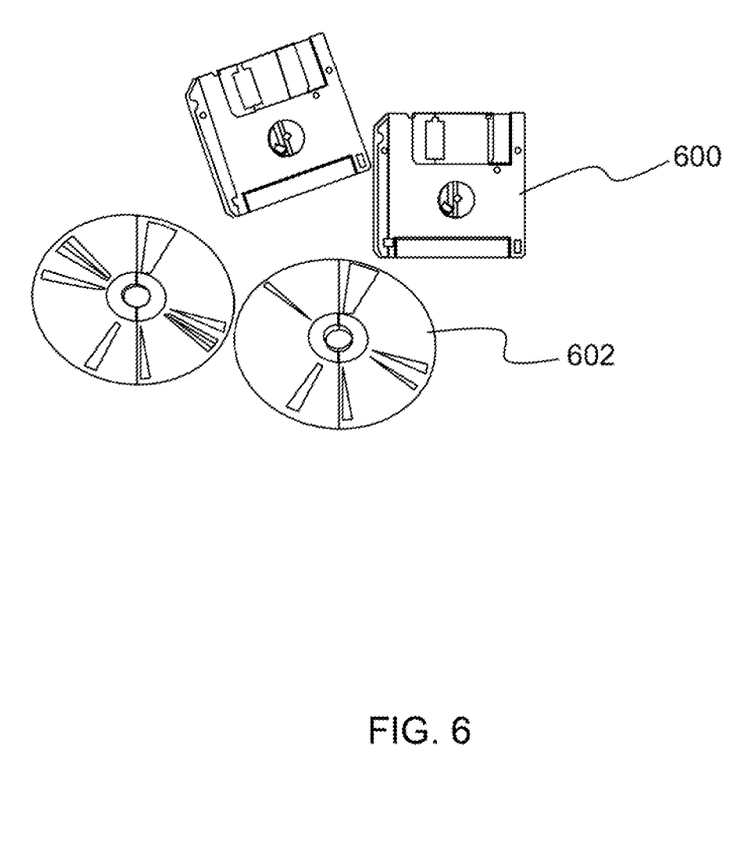
FIG. 6 is an illustration of a computer program product according to principles of the present invention.

An illustrative diagram of a computer program product embodying the present invention is depicted in FIG. 6. As a non-limiting example, the computer program product is depicted as either a floppy disk 600 or an optical disk 602. However, as mentioned previously, the computer program product generally represents computer readable code (i.e., instruction means or instructions) stored on any compatible non-transitory computer readable medium.

What is claimed is:

1. A system for object cueing in motion imagery, the system comprising:
   one or more processors and a non-transitory memory having instructions encoded thereon such that when the instructions are executed, the one or more processors perform operations of:
   extracting key points and bio-inspired features from input motion imagery, wherein the input motion imagery comprises a sequence of image frames obtained with a sensor;
   comparing bio-inspired features between consecutive image frames in the sequence of image frames to identify a set of image frames having similar bio-inspired features;
   matching keypoints between the set of image frames to generate a candidate set of matching keypoints;
   determining a ground plane homography model that fits the candidate set of matching keypoints to generate a set of correct matching keypoints and an accurate homography transformation between the set of image frames;
   registering each image within a selected time window into a reference frame's coordinate system using the homography transformation;
   obtaining a difference image between the reference frame and each registered image frame within the time window, resulting in a plurality of difference images;
   accumulating the plurality of difference images to calculate a detection image;
   detecting salient regions from the detection image by blob extraction; and
   producing object cues for surveillance use based on the detected salient regions.

2. The system as set forth in claim 1, wherein the one or more processors further perform an operation of thresholding the detection image by a predefined threshold value.

3. The system as set forth in claim 2, wherein the one or more processors further perform an operation of automatically selecting parameters for object cueing based on information obtained from the sensor, wherein the parameters comprise at least one of: time window size, minimum pixel area of a target of interest, maximum pixel area of a target of interest, and the predefined threshold value.

4. The system as set forth in claim 3, wherein the one or more processors further perform an operation of determining a size of a time window using information obtained from the sensor according to the following:

$$k = \frac{(\text{half}_{length})}{(\text{target}_{speed})} * (fps),$$

where k denotes a half size of a time window, $\text{half}_{length}$ denotes half of the length of a target, $\text{target}_{speed}$ denotes the speed of the target, and fps denotes a video frame rate in frames per second.

5. The system as set forth in claim 4, wherein the one or more processors further perform an operation of calculating the detection image according to the following:

$$D = Th\{\Sigma_{i=0}^{2k} \text{abs}(F_i - F_k)\} \; th = k*m*\sigma,$$

where D denotes the detection image, $\Sigma$ denotes a summation, abs denotes absolute value, $F_i$ is the ith image frame within a time window of size 2k+1, $F_k$ is a current image frame, Th represents a thresholding function, th denotes the predefined threshold value, $\sigma$ is an average background noise level, and m is a scaler for $\sigma$.

6. The system as set forth in claim 1, wherein the one or more processors further perform an operation of using random sample consensus to determine the ground plane homography model.

7. A computer-implemented method for object cueing in motion imagery, comprising:
   an act of causing a data processor to execute instructions stored on a non-transitory memory such that upon execution, the data processor performs operations of:
   extracting key points and bio-inspired features from input motion imagery, wherein the input motion imagery comprises a sequence of image frames obtained with a sensor;
   comparing bio-inspired features between consecutive image frames in the sequence of image frames to identify a set of image frames having similar bio-inspired features;

matching keypoints between the set of image frames to generate a candidate set of matching keypoints;

determining a ground plane homography model that fits the candidate set of matching keypoints to generate a set of correct matching keypoints and an accurate homography transformation between the set of image frames;

registering each image frame within a selected time window into a reference frame's coordinate system using the homography transformation;

obtaining a difference image between the reference frame and each registered image frame within the time window, resulting in a plurality of difference images;

accumulating the plurality of difference images to calculate a detection image;

detecting salient regions from the detection image by blob extraction; and producing object cues for surveillance use based on the detected salient regions.

8. The method as set forth in claim 7, wherein the data processor further performs an operation of thresholding the detection image by a predefined threshold value.

9. The method as set forth in claim 8, wherein the data processor further performs an operation of automatically selecting parameters for object cueing based on information obtained from the sensor, wherein the parameters comprise at least one of: time window size, minimum pixel area of a target of interest, maximum pixel area of a target of interest, and the predefined threshold value.

10. The method as set forth in claim 9, wherein the data processor further performs an operation of determining a size of a time window using information obtained from the sensor according to the following:

$$k = \frac{(\text{half}_{length})}{(\text{target}_{speed})} * (fps),$$

where k denotes a half size of a time window, $\text{half}_{length}$ denotes half of the length of a target, $\text{target}_{speed}$ denotes the speed of the target, and fps denotes a video frame rate in frames per second.

11. The method as set forth in claim 10, wherein the data processor further performs an operation of calculating the detection image according to the following:

$$D = Th\{\Sigma_{i=0}^{2k} \text{abs}(F_i - F_k)\} \ th = k*m*\sigma,$$

where D denotes the detection image, Σ denotes a summation, abs denotes absolute value, $F_i$ is the ith image frame within a time window of size 2k+1, $F_k$ is a current image frame, Th represents a thresholding function, th denotes the predefined threshold value, σ is an average background noise level, and m is a scaler for σ.

12. The method as set forth in claim 7, wherein the data processor further performs an operation of using random sample consensus to determine the ground plane homography model.

13. A computer program product for object cueing in motion imagery, the computer program product comprising computer-readable instructions stored on a non-transitory computer-readable medium that are executable by a computer having a processor for causing the processor to perform operations of:

extracting key points and bio-inspired features from input motion imagery, wherein the input motion imagery comprises a sequence of image frames obtained with a sensor;

comparing bio-inspired features between consecutive image frames in the sequence of image frames to identify a set of image frames having similar bio-inspired features;

matching keypoints between the set of image frames to generate a candidate set of matching keypoints;

determining a ground plane homography model that fits the candidate set of matching keypoints to generate a set of correct matching keypoints and an accurate homography transformation between the set of image frames;

registering each image frame within a selected time window into a reference frame's coordinate system using the homography transformation;

obtaining a difference image between the reference frame and each registered image frame within the time window, resulting in a plurality of difference images;

accumulating the plurality of difference images to calculate a detection image;

detecting salient regions from the detection image by blob extraction; and producing object cues for surveillance use based on the detected salient regions.

14. The computer program product as set forth in claim 13, further comprising instructions for causing the processor to perform an operation of thresholding the detection image by a predefined threshold value.

15. The computer program product as set forth in claim 14, further comprising instructions for causing the processor to perform an operation of automatically selecting parameters for object cueing based on information obtained from the sensor, wherein the parameters comprise at least one of: time window size, minimum pixel area of a target of interest, maximum pixel area of a target of interest, and the predefined threshold value.

16. The computer program product as set forth in claim 15, further comprising instructions for causing the processor to perform an operation of determining a size of a time window using information obtained from the sensor according to the following:

$$k = \frac{(\text{half}_{length})}{(\text{target}_{speed})} * (fps),$$

where k denotes a half size of a time window, $\text{half}_{length}$ denotes half of the length of a target, $\text{target}_{speed}$ denotes the speed of the target, and fps denotes a video frame rate in frames per second.

17. The computer program product as set forth in claim 16, further comprising instructions for causing the processor to perform an operation of calculating the detection image according to the following:

$$D = Th\{\Sigma_{i=0}^{2k} \text{abs}(F_i - F_k)\} \ th = k*m*\sigma,$$

where D denotes the detection image, Σ denotes a summation, abs denotes absolute value, $F_i$ is the ith image frame within a time window of size 2k+1, $F_k$ is a current image frame, Th represents a thresholding function, th denotes the predefined threshold value, σ is an average background noise level, and m is a scaler for σ.

18. The computer program product as set forth in claim 13, further comprising instructions for causing the processor to perform an operation of using random sample consensus to determine the ground plane homography model.

* * * * *